(12) United States Patent
Kou et al.

(10) Patent No.: US 10,496,707 B2
(45) Date of Patent: Dec. 3, 2019

(54) DETERMINING ENHANCED LONGEST COMMON SUBSEQUENCES

(71) Applicant: Microsoft Technology Licensing, LLC, Redmond, WA (US)

(72) Inventors: Lei Kou, Redmond, WA (US); Zhongyuan Li, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 15/587,979

(22) Filed: May 5, 2017

(65) Prior Publication Data

US 2018/0322218 A1 Nov. 8, 2018

(51) Int. Cl.
*G06F 17/00* (2019.01)
*G06F 16/903* (2019.01)

(52) U.S. Cl.
CPC .............................. *G06F 16/90344* (2019.01)

(58) Field of Classification Search
CPC ........... G06F 16/90344; G06F 11/0751; G06F 11/2273; G06F 11/263; G06F 16/739
See application file for complete search history.

(56) References Cited

U.S. PATENT DOCUMENTS

| 2012/0197533 A1* | 8/2012 | Nazarenko | G16B 30/10 |
| | | | 702/19 |
| 2013/0166221 A1 | 6/2013 | Inglis et al. | |

OTHER PUBLICATIONS

Rausch, et al., "Segment-based multiple sequence alignment", In Journal of Bioinfomiatics, vol. 24, Issue 16, Aug. 9, 2008, pp. 187-192.

Khalil, M. I., "Locating All Common Subsequences in Two DNA Sequences", In International Journal of Information Technology and Computer Science, vol. 5, May 2016, pp. 81-87.

Weng, et al., "An Enhanced ACO Algorithm with Pair Matching Strategy for the Longest Common Subsequence Problem", http://par.cse.nsysu.edu.tw/~cbyang/person/publish/c10klcs.pdf, Retrieved on: Mar. 15, 2017, 8 pages.

Benson, et al., "Longest Common Subsequence in k-length substrings", In Journal of Computing Research Repository, Feb. 2014, 15 pages.

Foulser, et al., "Parallel computation of Multiple biological sequence comparisons", In Research Report YALEU/DCS/RR-727, Jul. 1989, 33 pages.

(Continued)

*Primary Examiner* — Truong V Vo
(74) *Attorney, Agent, or Firm* — Goff IP Law PLLC; Jared S. Goff (57) ABSTRACT

Enhanced longest common subsequence techniques are provided to improve efficiency and accuracy of any process that uses long sequences. Two superscale data sequences are received. Each data sequence is divided into a set of segments based on one or more heuristics or user input. From the sets of segments, pairs of segments are selected and processed using any longest common subsequence algorithm to determine the longest common subsequence for each pair of segments. The results of the processing are merged to determine the enhanced longest subsequence which is the longest common subsequence for the received superscale data sequences. Dividing the superscale data sequences into segments allows for parallel processing of each segment pair, which results in a faster completion time than prior art methods for determining longest common subsequences.

20 Claims, 5 Drawing Sheets

(56) References Cited

OTHER PUBLICATIONS

Lin, et al., "Automatic Evaluation of Machine Translation Quality Using Longest Common Subsequence and Skip-Bigram Statistics", In Proceedings of 42nd Annual Meeting on Association for Computational Linguistics, Jul. 21, 2004, 8 pages.

Alves, et al., "A Coarse-Grained Parallel Algorithm for the All-Substrings Longest Common Subsequence Problem", In Journal of Algorithmica, vol. 45, Issue 3, Jul. 2006, 2 pages.

Hyyro, Heikki, "Bit-Parallel LCS-length Computation Revisited", In Proceedings of 15th Australasian Workshop on Combinatorial Algorithm, Jul. 2004, 12 pages.

* cited by examiner

DETERMINING ENHANCED LONGEST COMMON SUBSEQUENCES

BACKGROUND

The longest common subsequence (LCS) problem is the problem of finding the longest subsequence common to all sequences in a set of sequences (often just two sequences). It differs from problems of finding common substrings: unlike substrings, subsequences are not required to occupy consecutive positions within the original sequences. The longest common subsequence problem is a classic computer science problem, the basis of data comparison programs such as the diff utility, and has applications in bioinformatics.

It is a common requirement to get the LCS of two sequences. The well-known Hirschberg's algorithm solves this problem. Hirschberg's algorithm can solve the LCS problem in quadratic time and in linear space. Hirschberg's algorithm is a dynamic programming algorithm that finds the optimal sequence alignment between two strings. Hirschberg's algorithm is commonly used in computational biology to find maximal global alignments of DNA and protein sequences. Other LCS algorithms exist.

However, when applied to a superscale data sequence (SSDS), such as two 10 billion event sequences happening in a cloud data center or two 3 billion DNA sequences, the conventional LCS techniques, including Hirschberg's algorithm, are not practical. Because Hirschberg's algorithm is designed to run on a single machine, for an SSDS, problems emerge, such as the program cannot load all of the data events and sequences into memory, and because the algorithm is quadratic time bound, it is relatively slow and time consuming, and there is too much noise for practical use if the sequences are not naturally well aligned.

SUMMARY

Enhanced longest common subsequence techniques are provided to improve the efficiency and accuracy of any process that uses long sequences. Two superscale data sequences are received. Each data sequence is divided into a set of segments based on one or more heuristics or user input. From the sets of segments, pairs of segments are selected and processed using Hirschberg's algorithm (or any other LCS algorithm) to determine the longest common subsequence for each pair of segments. The results of the processing are merged to determine the enhanced longest subsequence which is the longest common subsequence for the received superscale data sequences. Dividing the superscale data sequences into segments allows for parallel processing of each segment pair, which results in a faster completion time than prior art methods for determining longest common subsequences.

In an implementation, a system for determining longest common subsequences in super-scale sequences using parallel processing is provided. The system includes at least one computing device and an enhanced longest common subsequence (ELCS) engine. The ELCS engine is adapted to: receive a first sequence; receive a second sequence; divide the first sequence into a first set of segments and the second sequence into a second set of segments; for each pair of segments comprising a selected first segment from the first set of segments and a selected second segment from the second set of segments: process the pair of segments to generate segment data, wherein the segment data includes a longest common subsequence of the pair of segments; merge the segment data from each of the pairs of segments; and determine a longest common subsequence of the first sequence and the second sequence based on the merged segment data.

In an implementation, a system for determining longest common subsequences in super-scale sequences using parallel processing is provided. The system includes at least one computing device and an enhanced longest common subsequence (ELCS) engine. The ELCS engine may be further adapted to: receive a first sequence; receive a second sequence; receive user input; divide the first sequence into a first set of segments and the second sequence into a second set of segments according to the user input; for each pair of segments comprising a selected first segment from the first set of segments and a selected second segment from the second set of segments: process the pair of segments to generate segment data, wherein the segment data includes a length of a longest common subsequence of the pair of segments; merge the segment data from each of the pairs of segments; and determine a length of a longest common subsequence of the first sequence and the second sequence based on the merged subsequence data.

In an implementation, a method for determining longest common subsequences in super-scale sequences using parallel processing is provided. The method includes: receiving user input by a computing device; dividing a first sequence into a first set of segments and a second sequence into a second set of segments based on the user input by the computing device; for each pair of segments comprising a selected first segment from the first set of segments and a selected second segment from the second set of segments: processing the pair of segments to generate segment data, wherein the segment data includes a longest common subsequence of the pair of segments; merging the segment data from each of the pairs of segments by the computing device; determining a longest common subsequence of the first sequence and the second sequence based on the merged segment data by the computing device; and providing the longest common subsequence of the first sequence and the second sequence by the computing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DETAILED DESCRIPTION

Figure 1:
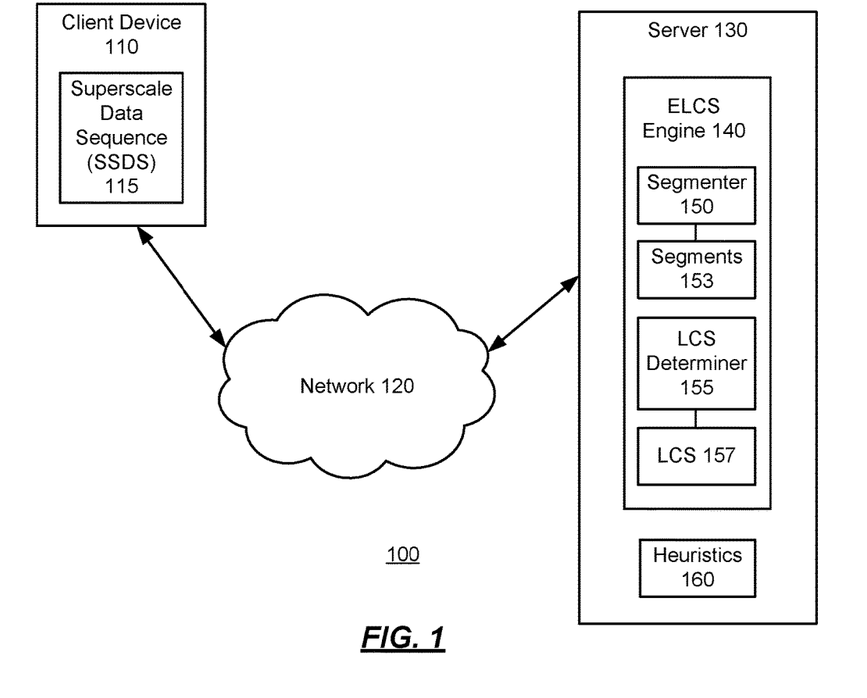
FIG. 1 is an illustration of an exemplary environment for determining ELCSs.

FIG. 1 is an illustration of an exemplary environment 100 for determining enhanced longest common subsequences (ELCSs). The environment 100 may include a client device 110 and a server 130 in communication through a network 120. The network 120 may be a variety of network types including the public switched telephone network (PSTN), a cellular telephone network, and a packet switched network (e.g., the Internet). Although only one client device 110 and one server 130 are shown in FIG. 1, there is no limit to the number of client devices 110 and servers 130 that may be supported.

Figure 6:
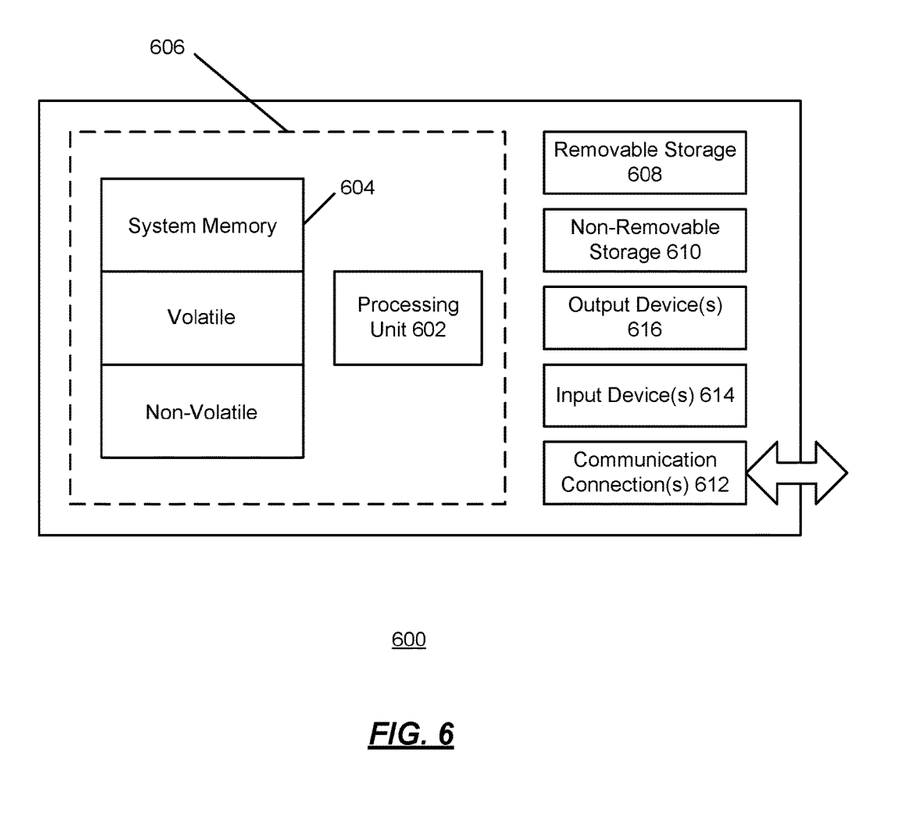
FIG. 6 shows an exemplary computing environment in which example embodiments and aspects may be implemented.

The client device 110 and the server 130 may be implemented using a variety of computing devices such as smart phones, desktop computers, laptop computers, and tablets. Other types of computing devices may be supported. A suitable computing device is illustrated in FIG. 6 as the computing device 600.

The client device 110 may include one or more superscale data sequences (SSDSs) 115. An SSDS 115 is a sequence containing a large number (e.g., on the order of billions) of events, elements, data points, strings, and/or sequences. The SSDSs 115 may be stored in a memory device or other storage device residing on or within the client device 110 or otherwise accessible by the client device 110. In some implementations, each SSDS 115 may be resident on a device that is remote from the client device 110, but otherwise accessible by the client device 110, such as through a network such as the network 120. The SSDSs 115 may be stored in a single memory device or storage device, or may be spread over multiple memory devices and storage devices, and/or over multiple client devices 110 or other computing devices (including the server 130 or any other server(s)). There is no limit to the number of devices over which the SSDSs 115 may be spread or stored.

In an implementation, the server 130 includes an ELCS engine 140 that is configured to determine an ELCS 170 for two SSDSs 115. As described above, each SSDS 115 may have billions of event or elements, and therefore determining the LCS 157 (or ELCS 170) for two SSDSs 115 may take an extremely large amount of computing resources. Accordingly, to reduce the overall amount of time required to compute the ELCS 170, the ELCS engine 140 may include a segmenter 150 and an LCS determiner 155.

The segmenter 150 may divide each SSDS 115 into a plurality of segments 153. The ELCS engine 140 may select pairs of segments 153 that include a segment 153 from each SSDS 115. For each selected pair of segments 153, the LCS determiner 155 may determine the LCS 157 for the pair of segments 153 using an algorithm such as Hirschberg's algorithm. Other LCS algorithms may be used such as the string-to-string correction problem. The LCS 157 generated for each pair of segments 153 may be merged by the ELCS engine 140 to create the ELCS 170 for the SSDSs 115.

As may be appreciated, by segmenting each of the SSDSs 115, determining the LCS 157 for pairs of segments 153, and determining the ELCS 170 by merging each LCS 157, determining the ELCS 170 may be performed in parallel by multiple servers 130 and/or client devices 110, to greatly reduce the amount of time needed to compute the ELCS 170. For example, the step of determining the LCS 157 for each pair can be computed simultaneously in parallel by a different computing device or processor core to reduce the total completion time of the ELCS 170.

The segmenter 150 may generate the segments 153 for a first SSDS 115 and a second SSDS 115. In some implementations, each segment 153 may be approximately the same length and the segmenter 150 may generate the segments 153 by dividing each SSDS 115 into segments 153 of approximately the same length.

In other implementations, the segmenter 150 may generate the segments 153 for a first SSDS 115 and a second SSDS 115 based one or more heuristics 160. Depending on the implementation, the heuristics 160 may be received from a user or an administrator as part of user input, e.g., from the client device 110 or another computing device or input device, and may be stored and/or maintained on the server 130.

One example of such heuristics 160 may be to generate the segments 153 based on unique subsequences. For example, the segmenter 150 may generate all unique subsequences for an SSDS 115, and may generate a segment 153 for each generated subsequence. An example pseudo-code function that generates segments 153 for a first SSDS 115 and a second SSDS 115 is illustrated below:

```
FindSegments(A, B, Sa, Sb)
{
    Initialize HashSetA to empty;
    Initialize HashSetA to empty;
    For i <- 1 to m
        If A[i] not in HashSetA then
            HashSetA.Add(A[i]);
            Xa.Append(A[i]);
    For i <- 1 to n
        If B[i] not in HashSetB then
            HashSetB.Add(B[i]);
            Xb.Append(B[i]);
    FindLCS(Xa, Xb, L);
    Generate Sa based Xa and L;
    Generate Sb based Xb and L;
}
```

In the example shown, the function takes as an input an SSDS 115 "A" which is the first SSDS 115 of length m, and an SSDS 115 "B" which is the first SSDS 115 of length n. The SSDS 115 A may be thought of as a vector $A=(A_1 A_2 \ldots A_m)$, and the SSDS 115 B may be thought of as a vector $B=(B_1 B_2 \ldots B_n)$. Sa and Sb are the segment indexes for the SSDS 115 A and the SSDS 115 B, respectively. The segment indexes S may show how to divide the associated SSDS 115 into segments 153. Other variables referred to in the function include L which is a matrix where the entry L[i,j] is the maximum length of any possible common subsequence of $A_{1i}$ and $B_{1j}$. The matrix L may be used as part of Hirschberg's algorithm.

The function initializes a hash for each SSDS 115 (i.e., the HashSetA and the HashSetB). The function steps through each value of the SSDS 115 A and the SSDS 115 B in a loop, and if the value is not already in the respective hash it is added to the hash. At the end of the loop the HashSetA includes a unique subsequence of the SSDS 115 A and the HashSetB includes a unique subsequence of the SSDS 115 B.

The function calls the function FindLCS using Xa and Xb. The function FindLCS uses the Hirschberg's algorithm to calculate the matrix L based on Xa and Xb. The matrix L may be used to generated segments 153 for the SSDS 115 A and the SSDS 115 B in view of the variables Xa and Xb, respectively.

Other heuristics 160 may be used to generate the segments 153. For example, where the SSDS 115 is a log generated by a data center or other server, the segmenter 150 may divide the SSDS 115 into segments 153 based on server heartbeat events. In another example, where the SSDS 115 is a DNA sequence, the segmenter 150 may divide the SSDS 115 into segments 153 based on DNA sequence features. Other heuristics 160 may be used.

Depending on the implementation, the heuristics 160 may be selected or provided as user input. For example, the user may provide an input such as a static input like "if you see this 'flag', then separate here".

After the segmenter 150 divides the first SSDS 115 and the second SSDS 115 into segments 153, the LCS determiner 155 may determine the LCS 157 for each segment pair of the segments 153 corresponding to the first SSDS 115 and the segments 153 corresponding to the second SSDS 115.

Depending on the implementation, the segments 153 may be paired by selecting a first pair comprising a first segment 153 of the segments 153 of the SSDS 115 A and a first segment 153 of the segments 153 of the SSDS 115 B, followed by a second pair comprising a second segment 153 of the segments 153 of the SSDS 115 A and a second segment 153 of the segments 153 of the SSDS 115 B, etc. The segments 153 may be selected based on their order in the corresponding SSDS 115, for example. Other methods for selecting pairs of segments 153 may be used.

The ELCS engine 140 may calculate the LCS 157 for each segment 153 pair using the LCS determiner 155 and Hirschberg's algorithm. Depending on the implementation, the LCS determiner 155 may process the segment 153 pair using Hirschberg's algorithm to generate segment data that includes one or both of the LCS 157 for the segment 153 pair and a length of the LCS 157 for the segment 153 pair. Other LCS algorithms may be used such as the string-to-string correction problem.

To improve the overall time used to generate the ELCS 170, the ELCS engine 140 may process some or all of the segment 153 pairs in parallel. Accordingly, the ELCS engine 140 may dispatch each segment 153 pair to a computation node that executes an instance of the LCS determiner 155. Each computation node may correspond to a different computing device, processor, or processor core, for example. Each instance of the LCS determiner 155 may process its respective segment 153 pair, and may generate data that includes one or both of the LCS 157 and the length of the LCS 157 for the segment 153 pair.

An example pseudocode function called "SplitSSDSAnd-Dispatch" that dispatches pairs of segments 153 to computation nodes of the LCS determiner 155 for parallel processing is illustrated bellow:

```
SplitSSDSAndDispatch(A, B, Sa, Sb)
{
    IndexA <- 0;
    IndexB <- 0;
    For i <- 1 to Sa.Length
    {
        NextIndexA <- Sa[i];
        CurrentSegmentA <- Sa[IndexA ... NextIndexA];
        NextIndexB <- Sb[i];
        CurrentSegmentB <- Sb[IndexB ... NextIndexB];
        DispatchSegmentToNextNode(CurrentSegmentA, CurrentSegmentB)
    }
}
```

In the example shown, the function takes as an input the SSDS 115 A, the SSDS 115 B, and the segment indexes Sa and Sb. The function uses two variables, CurrentSegmentA and CurrentSegmentB to store the current segments 153 of the SSDS 115 A and SSDS 115 B, respectively. The function uses the variables IndexA and IndexB to keep track of the current element in the SSDS 115 A and the SSDS 115 B, respectively. The function steps through the SSDS 115 A and the SSDS 115 B and adds elements to the CurrentSegmentA and the CurrentSegmentB from positions up to the value of the current segment index Sa (or Sb). The function dispatches the completed segments 153 using the function "DispatchSegmentToNextNode(CurrentSegmentA, CurrentSegmentB)". The function continues to build and dispatch segments 153 until the end of the segment index Sa (or Sb) is reached (i.e., "Sa.length").

An example pseudocode function called "FindLCSLength" that determines the length of the LCS 157 using Hirschberg's algorithm is illustrated bellow:

```
FindLCSLength(A, m, B, n, LL)
{
    ULONG K0[m];
    ULONG K1[m] <- 0;
    for i <- 1 to n
    {
        K1 <- K0;
        for j <- 1 to n
        {
            if A[i] == B[j] then K1[j] <- K0[j-1] + 1;
            else K1[j] <- max{K1[j-1], K0[j]};
        }
    }
    LL <- K1;
}
```

In the example shown, the function takes as an input the segment 153 of the pair corresponding to the SSDS 115 A, the segment 153 of the pair corresponding to the SSDS 115 B, the length m of SSDS 115 A, the length n of the SSDS 115 B, and a row LL of the matrix L. The function outputs the row LL which includes the length of the LCS 157 for the segments 153 of the pair.

The ELCS engine 140 may merge the LCS 157 generated for each of the pairs of segments 153 to generate the ELCS 170 for the first SSDS 115 and the second SSDS 115. Depending on the implementation, the ELCS engine 140 may also generate a length of the ELCS 170 for the first SSDS 115 and the second SSDS 115. The ELCS 170 may be the longest common subsequence for the first SSDS 115 and the second SSDS 115. Because the ELCS 170 was generated in parallel by the ELCS engine 140 using segments 153, it may be generated in less overall time than an LCS 157 using previous methods.

Figure 2:
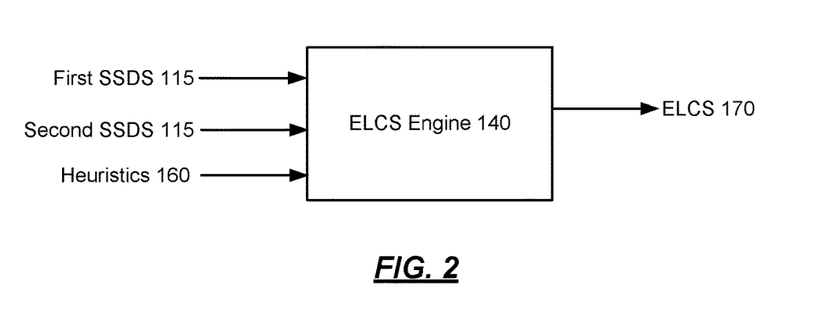
FIG. 2 is an illustration of an implementation of an exemplary ELCS engine.

FIG. 2 is an illustration of an implementation of an exemplary ELCS engine 140. As shown, the ELCS engine 140 receives the first SSDS 115, second SSDS 115, and the heuristics 160 as input, and outputs an ELCS 170 as the result.

Depending on the implementation, the segmenter 150, the LCS determiner 155, and the heuristics 160, along with the SSDS 115, can reside on the same computer system or on one or more separate computer systems. The various aspects and features described herein may be implemented on any numbers of client devices and servers, depending on the implementation. It should be appreciated that the heuristics 160 may be stored in a heuristics library, and may reside within a different server, client, or other computing device connected to the network 120.

Figure 3:
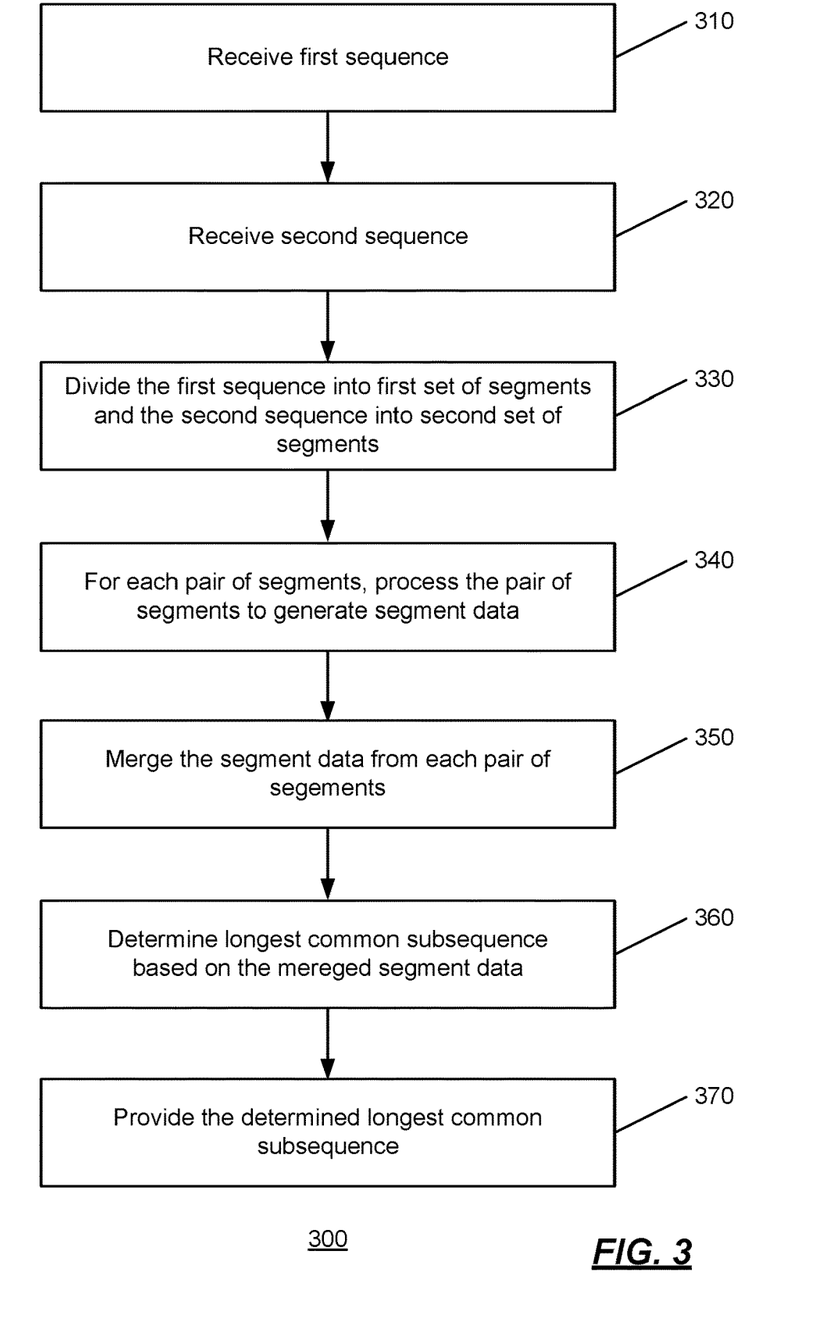
FIG. 3 is an operational flow of an implementation of a method for providing an ELCS for a first SSDS and a second SSDS.

FIG. 3 is an operational flow of an implementation of a method 300 for providing an ELCS 170 for a first SSDS 115 and a second SSDS 115. The method 300 may be implemented by the ELCS engine 140, for example.

At 310, a first sequence is received. The first sequence may be the first SSDS 115 and may be received by the ELCS engine 140 from a user associated with a client device 110 through a network 120. The first SSDS 115 may be a superscale data sequence and may include billions of entries or events. Example data sequences may include server logs or DNS sequences. Other data sequences may be supported.

At 320, a second sequence is received. The second sequence may be the second SSDS 115 and may be received by the ELCS engine 140 from the user associated with the client device 110 through the network 120. The second SSDS 115 may the same size as the first SSDS 115. Alternatively, the second SSDS 115 and the first SSDS 115 may be different sizes.

At 330, the first sequence is divided into a first set of segments and the second sequence is divided into a second set of segments. The first and second sequences may be divided by the segmenter 150 based on one or more heuristics 160 and/or user input.

At 340, for each pair of segments, the pair of segments is processed to generate segment data. Each pair of segments 153 may be processed by the LCS determiner 155 of the ELCS engine 140. Each pair of segments 153 may include a first segment selected from the first set of segments and a second segment selected from the second set of segments. The segments 153 may be consecutive segments and may be selected for a pair in the order that they appear in their associated SSDS 115. The segment data may include an LCS 157 of the pair of segments 153. The LCS 157 may be determined by processing each pair of segments 153 using Hirschberg's algorithm. Other methods or techniques for determining an LCS 157 may be used such as the string-to-string correction problem.

Depending on the implementation, some or all of the pairs of segments 153 may be processed substantially in parallel. For example, each pair may be processed by an instance of the LCS determiner 155 running on a different processing node.

At 350, the segment data from each of the pair of segments is merged. The segment data from each pair of segments 153 may be merged by the ELCS engine 140.

At 360, a longest common subsequence is determined based on the merged segment data. The ELCS engine 140 may merge the LCS 157 from the segment data for each pair of segments 153 to determine the ELCS 170 for the first SSDS and the second SSDS, for example.

At 370, the determined longest common subsequence is provided. The determined longest common subsequence may be provided by the ELCS engine 140 to the user of the client device that provided the first SSDS and the second SSDS. The ELCS 170 may be provided through the network 120.

Figure 4:
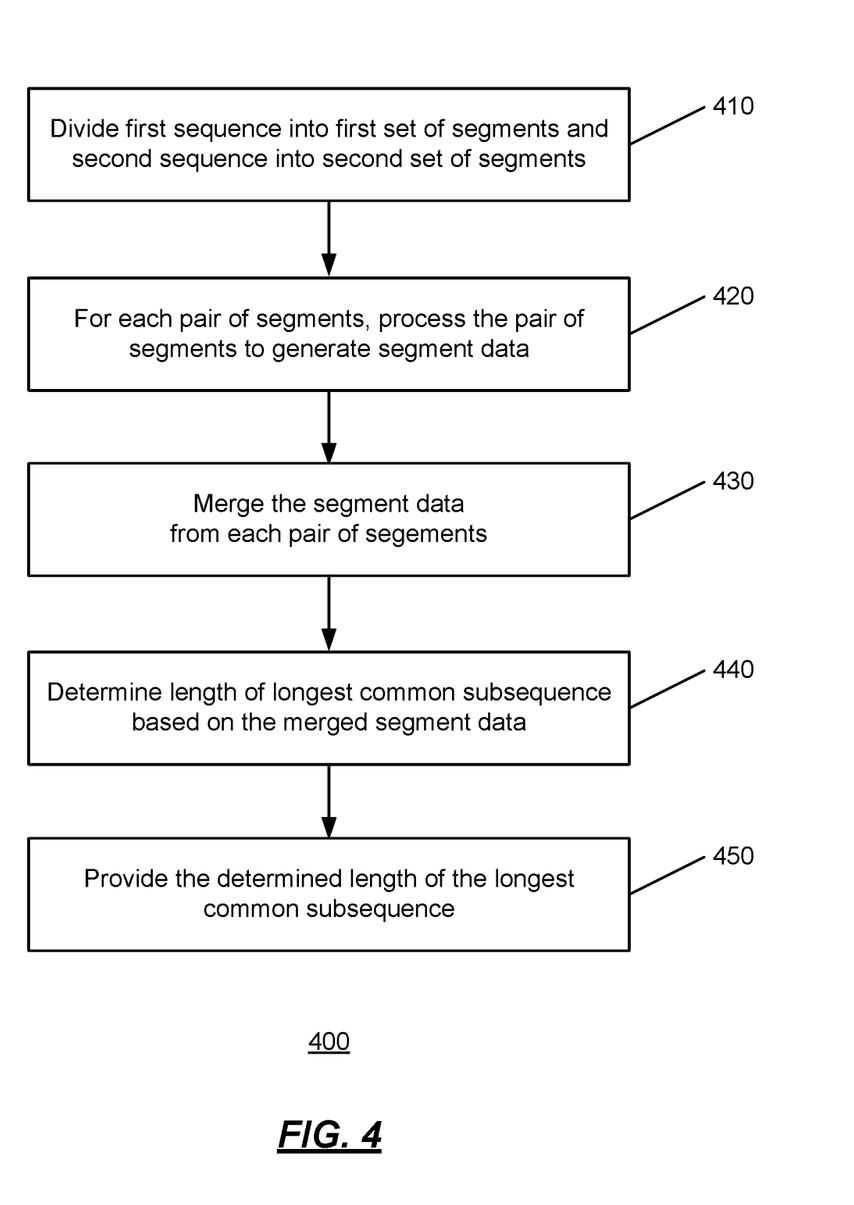
FIG. 4 is an operational flow of an implementation of a method for providing a length of an ELCS for a first SSDS and a second SSDS.

FIG. 4 is an operational flow of an implementation of a method 400 for providing a length of an ELCS 170 for a first SSDS and a second SSDS. The method 400 may be implemented by the ELCS engine 140, for example.

At 410, a first sequence is divided into a first set of segments and a second sequence is divided into a second set of segments. The first and second sequences may be the first SSDS and the second SSDS, and may be divided by the segmenter 150 into segments 153 based on one or more heuristics 160 and/or user input.

The first SSDS and second SSDS may be superscale data sequences and may include billions of entries or events. Example data sequences may include server logs or DNS sequences. Other data sequences may be supported. The first SSDS and the second SSDS may have been provided by a user of a client device 110 through the network 120.

At 420, for each pair of segments, the pair of segments is processed to generate segment data. Each pair of segments 153 may be processed by the LCS determiner 155 of the ELCS engine 140. Each pair of segments 153 may include a first segment selected from the first set of segments and a second segment selected from the second set of segments. The segments 153 may be consecutive segments and may be selected for a pair in the order that they appear in the associated SSDS 115. The segment data may include a length of an LCS 157 of the pair of segments. The length of the LCS 157 may be determined by processing each pair using Hirschberg's algorithm, or any other LCS algorithm.

At 430, the segment data from each of the pair of segments is merged. The segment data from each pair of segments 153 may be merged by the ELCS engine 140.

At 440, a length of a longest common subsequence is determined based on the merged segment data. The ELCS engine 140 may merge the lengths of the LCSs 157 from the segment data for each pair of segments 153 to determine the length of the ELCS 170 for the first SSDS and the second SSDS.

At 450, the determined length of the longest common subsequence is provided. The determined length of the longest common subsequence may be provided by the ELCS engine 140 to the user of the client device 110 that provided the first SSDS and the second SSDS. The length may be provided by the ELCS engine 140 through the network 120.

Figure 5:
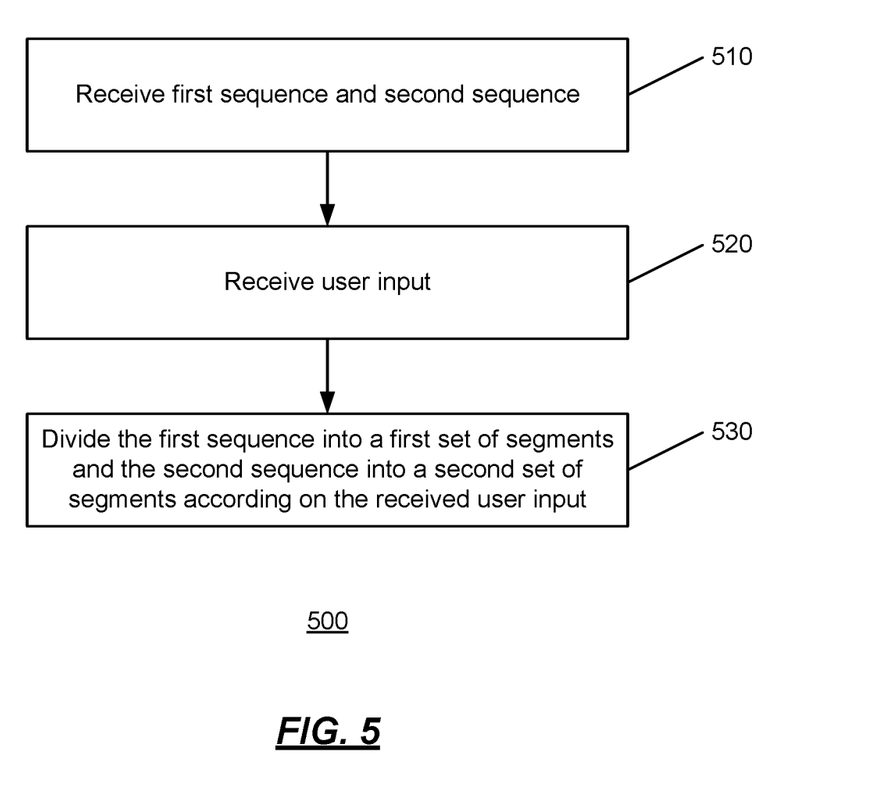
FIG. 5 is an operational flow of an implementation of a method for dividing a first SSDS and a second SSDS into a plurality of segments.

FIG. 5 is an operational flow of an implementation of a method 500 for dividing a first SSDS and a second SSDS into a plurality of segments 153. The method 500 may be implemented by the ELCS engine 140, for example.

At 510, a first sequence and a second sequence are received. The first sequence may be the first SSDS and the second sequence may be the second SSDS, and both sequences may be received by the ELCS engine 140 from a user associated with a client device 110 through a network 120. The sequences may be superscale data sequences.

At 520, user input is received. The user input may be received by the segmenter 150 of the ELCS engine 140 from the user that provided the first sequence and the second sequence. The user input may identify one or more heuristics 160 that may specify how to divide the first sequence and the second sequence into segments 153.

In one implementations, the one or more heuristics 160 may be to divide the first sequence and the second sequence into segments 153 based on one or more unique subsequences in the first sequence and the second sequence. In another example, the one or more heuristics 160 may be to divide the first sequence and the second sequence into segments 153 by looking for a flag, or sequence of characters, in the first sequence and the second sequence. Where the first sequence and second sequence are DNS sequences, the one or more heuristics 160 may be to divide the first sequence and the second sequence based on one or more selected DNA features. Where the first sequence and the second sequence are server logs, the one or more heuristics 160 may be to divide the first sequence and the second sequence based on one or more selected DNA features. Other types of heuristics 160 may be used.

At 530, the first sequence is divided into a first set of segments and the second sequence is divided into a second set of segments. The first sequence and the second sequence may be divided by the segmenter 150 of the of the ELCS engine 140 according to the one or more heuristics 160 of the user input to generate the segments 153.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

In an implementation, a system for determining longest common subsequences in super-scale sequences using parallel processing is provided. The system includes: at least one computing device and an enhanced longest common subsequence (ELCS) engine. The ELCS engine is adapted to: receive a first sequence; receive a second sequence; divide the first sequence into a first set of segments and the second sequence into a second set of segments; for each pair of segments comprising a selected first segment from the first set of segments and a selected second segment from the second set of segments: process the pair of segments to generate segment data, wherein the segment data includes a longest common subsequence of the pair of segments; merge the segment data from each of the pairs of segments; and determine a longest common subsequence of the first sequence and the second sequence based on the merged segment data.

Implementations may include some or all of the following features. The ELCS engine may be further adapted to provide the longest common subsequence of the first sequence and the second sequence. The ELCS engine may be further adapted to provide a length of the longest common subsequence of the first sequence and the second sequence. The ELCS engine adapted to divide the first sequence into the first set of segments and the second sequence into the second set of segments may include the ELCS engine adapted to adapted to divide the first sequence into the first set of segments and the second sequence into the second set of segments using one or more heuristics. The ELCS engine may be further adapted to receive user input, and the ELCS engine adapted to divide the first sequence into the first set of segments and the second sequence into the second set of segments may include the ELCS engine adapted to divide the first sequence into the first set of segments and the second sequence into the second set of segments based on the user input. The ELCS engine adapted to divide the first sequence into the first set of segments and the second sequence into the second set of segments may include the ELCS engine adapted to: determine unique subsequences in the first sequence and the second sequence; and divide the first sequence into the first set of segments and the second sequence into the second set of segments based on the determined unique subsequences. The ELCS engine adapted to process the pair of segments to generate segment data may include the ELCS engine adapted to process the pair of segments using Hirschberg's algorithm or the string-to-string correction problem. The segment data may further include a length of a longest common subsequence of the pair of segments. Each pair of segments may be processed in parallel. The first sequence may include one or more of a log or a DNA sequence.

In an implementation, a system for determining longest common subsequences in super-scale sequences using parallel processing is provided. The system includes at least one computing device and an enhanced longest common subsequence (ELCS) engine. The ELCS engine may be further adapted to: receive a first sequence; receive a second sequence; receive user input; divide the first sequence into a first set of segments and the second sequence into a second set of segments according to the user input; for each pair of segments comprising a selected first segment from the first set of segments and a selected second segment from the second set of segments: process the pair of segments to generate segment data, wherein the segment data includes a length of a longest common subsequence of the pair of segments; merge the segment data from each of the pairs of segments; and determine a length of a longest common subsequence of the first sequence and the second sequence based on the merged subsequence data.

Implementations may include some or all of the following features. The ELCS engine may be further adapted to provide the determined length of the longest common subsequence of the first sequence and the second sequence. The ELCS engine may be further adapted to provide the longest common subsequence of the first sequence and the second sequence. The ELCS engine adapted to process the pair of segments to generate segment data may include the ELCS engine adapted to process the pair of segments using a longest common substring algorithm. The segment data may further include a longest common subsequence of the pair of segments. Each pair of segments may be processed in parallel. The first sequence may include one or more of a log or a DNA sequence.

In an implementation, a method for determining longest common subsequences in super-scale sequences using parallel processing is provided. The method includes: receiving user input by a computing device; dividing a first sequence into a first set of segments and a second sequence into a second set of segments based on the user input by the computing device; for each pair of segments comprising a selected first segment from the first set of segments and a selected second segment from the second set of segments: processing the pair of segments to generate segment data, wherein the segment data includes a longest common subsequence of the pair of segments; merging the segment data from each of the pairs of segments by the computing device; determining a longest common subsequence of the first sequence and the second sequence based on the merged segment data by the computing device; and providing the longest common subsequence of the first sequence and the second sequence by the computing device.

Implementations may include some or all of the following features. Processing the pair of segments to generate segment data may include processing the pair of segments using Hirschberg's algorithm or the string-to-string correction problem. The segment data may further include a length of a longest common subsequence of the pair of segments. Each pair of segments is processed in parallel.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for determining longest common subsequences in super-scale sequences using parallel processing, the system comprising:
    at least one computing device; and
    an enhanced longest common subsequence (ELCS) engine adapted to:
        receive a first sequence;
        receive a second sequence;
        divide the first sequence into a first set of segments and the second sequence into a second set of segments;
        for each pair of segments comprising a selected first segment from the first set of segments and a selected second segment from the second set of segments, process the pair of segments to generate segment data, wherein the segment data identifies a sequence as being a longest common subsequence of the pair of segments;
        merge the segment data from each of the pairs of segments; and
        determine a longest common subsequence of the first sequence and the second sequence based on the merged segment data.

2. The system of claim 1, wherein the ELCS engine is further adapted to identify a sequence as being the longest common subsequence of the first sequence and the second sequence.

3. The system of claim 1, wherein the ELCS engine is further adapted to provide an indication of a length of the longest common subsequence of the first sequence and the second sequence.

4. The system of claim 1, wherein the ELCS engine being adapted to divide the first sequence into the first set of segments and the second sequence into the second set of segments comprises the ELCS engine being adapted to divide the first sequence into the first set of segments and the second sequence into the second set of segments using one or more heuristics.

5. The system of claim 1, wherein the ELCS engine being adapted to divide the first sequence into the first set of segments and the second sequence into the second set of segments comprises the ELCS engine being adapted to:

determine unique subsequences in the first sequence and the second sequence; and divide the first sequence into the first set of segments and the second sequence into the second set of segments based on the determined unique subsequences.

6. The system of claim 1, wherein the ELCS engine being adapted to process the pair of segments to generate segment data comprises the ELCS engine being adapted to process the pair of segments using Hirschberg's algorithm or the string-to-string correction problem.

7. The system of claim 1, wherein the segment data further includes a length of a longest common subsequence of the pair of segments.

8. The system of claim 1, wherein the processing of each pair of segments comprises processing multiple pairs of segments in parallel.

9. The system of claim 1, wherein the first sequence comprises one or more of a log or a DNA sequence.

10. A system for determining longest common subsequences in super-scale sequences using parallel processing, the system comprising:
    at least one computing device; and
    an enhanced longest common subsequence (ELCS) engine adapted to:
       receive a first sequence;
       receive a second sequence;
       receive user input;
       divide the first sequence into a first set of segments and the second sequence into a second set of segments according to the user input;
       for each pair of segments comprising a selected first segment from the first set of segments and a selected second segment from the second set of segments, process the pair of segments to generate segment data, wherein the segment data includes a length of a longest common subsequence of the pair of segments;
       merge the segment data from each of the pairs of segments; and
       determine a length of a longest common subsequence of the first sequence and the second sequence based on the merged segment data.

11. The system of claim 10, wherein the ELCS engine is further adapted to provide the determined length of the longest common subsequence of the first sequence and the second sequence.

12. The system of claim 10, wherein the ELCS engine is further adapted to provide the longest common subsequence of the first sequence and the second sequence.

13. The system of claim 10, wherein the ELCS engine being adapted to process the pair of segments to generate segment data comprises the ELCS engine being adapted to process the pair of segments using a longest common substring algorithm.

14. The system of claim 10, wherein the segment data further includes an identification of the longest common subsequence of the pair of segments.

15. The system of claim 10, wherein the processing of each pair of segments comprises processing multiple pairs of segments in parallel.

16. The system of claim 10, wherein the first sequence comprises one or more of a log or a DNA sequence.

17. A method for determining longest common subsequences in super-scale sequences using parallel processing, the method comprising:
    receiving user input by a computing device;
    dividing a first sequence into a first set of segments and a second sequence into a second set of segments based on the user input by the computing device;
    for each pair of segments comprising a selected first segment from the first set of segments and a selected second segment from the second set of segments, processing the pair of segments to generate segment data, wherein the segment data identifies a sequence as being a longest common subsequence of the pair of segments;
    merging the segment data from each of the pairs of segments by the computing device;
    determining a longest common subsequence of the first sequence and the second sequence based on the merged segment data by the computing device; and
    identifying the determined longest common subsequence as being the longest common subsequence of the first sequence and the second sequence by the computing device.

18. The method of claim 17, wherein processing the pair of segments to generate segment data comprises processing the pair of segments using Hirschberg's algorithm or the string-to-string correction problem.

19. The method of claim 17, wherein the segment data further includes a length of a longest common subsequence of the pair of segments.

20. The method of claim 17, wherein the processing of each pair of segments comprises processing multiple pairs of segments in parallel.

* * * * *